United States Patent
Ashish et al.

(10) Patent No.: US 8,005,480 B2
(45) Date of Patent: Aug. 23, 2011

(54) COMMUNICATION INITIALIZATION METHOD AT MEDIUM ACCESS CONTROL LAYER IN A COGNITIVE RADIO WIRELESS COMMUNICATION SYSTEM

(75) Inventors: Pandharipande Ashish, Yongin-si (KR); Duck-Dong Hwang, Yongin-si (KR); Jae-Myeong Kim, Seoul (KR); Sang-Jo Yoo, Incheon (KR); Chang-Gun Seo, Incheon (KR); Jae-Hak Chung, Seoul (KR)

(73) Assignees: Samsung Electronics Co., Ltd. (KR); Inha-Industry Partnership Institute (KR)

( * ) Notice: Subject to any disclaimer, the term of this patent is extended or adjusted under 35 U.S.C. 154(b) by 332 days.

(21) Appl. No.: 11/592,385

(22) Filed: Nov. 3, 2006

(65) Prior Publication Data

US 2007/0104140 A1    May 10, 2007

(30) Foreign Application Priority Data

Nov. 5, 2005   (KR) .................. 10-2005-0105718

(51) Int. Cl.
*H04W 72/00* (2009.01)
*H04W 74/00* (2009.01)
*H04W 4/00* (2009.01)
*H04B 7/00* (2006.01)
*H04B 7/212* (2006.01)

(52) U.S. Cl. ............... 455/450; 455/451; 455/452.1; 455/452.2; 455/454; 455/455; 455/464; 455/509; 455/515; 455/516; 370/329; 370/348

(58) Field of Classification Search ............... 370/338, 370/329, 348; 455/450–455, 464, 509, 515–516
See application file for complete search history.

(56) References Cited

U.S. PATENT DOCUMENTS

| | | | |
|---|---|---|---|
| 2006/0221918 A1* | 10/2006 | Wang | 370/338 |
| 2007/0220547 A1* | 9/2007 | Teskey | 725/39 |
| 2008/0051086 A2* | 2/2008 | Etemad et al. | 455/436 |

OTHER PUBLICATIONS

Author=Prof. Robert W. Brodersen Title=Corvus: A Cognitive Radio Approach for Usage of Virtual Unlicensed Spectrum Date=Jul. 29, 2004 Pertinent Pages=21.*
Corie Lok, Spectrum Scavenging, Jul. 2005, www.technologyreview.com, 1.*
Control Signal, http://www.ait-pg.co.uk, 1 page.*
Control Signal, http://encyclopedia2.thefreedictionary.com, 1 page.*

* cited by examiner

*Primary Examiner* — Jinsong Hu
*Assistant Examiner* — Munsoon Choo
(74) *Attorney, Agent, or Firm* — NSIP Law

(57) ABSTRACT

A communication initialization method at a MAC layer in a CR wireless communication system is provided. The use or non-use of a frequency band is sensed over a broadband with a minimized sensing time in a non-interfering manner with existing communication systems.

12 Claims, 7 Drawing Sheets

COMMUNICATION INITIALIZATION METHOD AT MEDIUM ACCESS CONTROL LAYER IN A COGNITIVE RADIO WIRELESS COMMUNICATION SYSTEM

PRIORITY

This application claims priority under 35 U.S.C. §119 to an application entitled "Communication Initialization Method at Medium Access Control Layer in a Cognitive Radio Wireless Communication System" filed in the Korean Intellectual Property Office on Nov. 5, 2005 and assigned Serial No. 2005-105718, the contents of which are incorporated herein by reference.

BACKGROUND OF THE INVENTION

1. Field of the Invention

The present invention relates to a communication initialization method at a Medium Access Control (MAC) layer in a Cognitive Radio (CR) wireless communication system.

2. Description of the Related Art

Along with the rapid development of wireless communication systems and a variety of wireless communication services, strict frequency separation is required for coexistence with legacy communication systems. There is also a short supply of spectrum frequencies due to multiple allocations over all of the frequencies which can be commercially used. Deployment of a new wireless platform faces a serious shortage of spectrum resources, particularly in lower frequency bands than a few gigahertzes. To solve this spectrum shortage, the concept of CR has been introduced, which is a frequency-agile technique for sensing allocated but unused spectrum and efficiently sharing the detected spectrum.

Many countries have strictly regulated the use of frequency resources subject to their frequency policies, and service providers use frequencies through licensing and allocation from their governments. As opposed to legacy wireless communication systems, the CR technology enables the use of allocated but unused frequency resources in a non-interfering manner with wireless communications from legacy service providers.

In order to meet the recent increasing demand for limited frequency resources, there is a pressing need for the CR technology, which has attracted much interest since the U.S. Federal Communications Commission (FCC) commented on the possibility of frequency sharing in a Notice of Proposed Rule Making (NPRM) in December 2003. Such a major example is the standardization of the Institute of Electrical and Electronics Engineers (IEEE) 802.22 Wireless Regional Area Network (WRAN) seeking the development of a CR communication platform. The IEEE 802.22 WRAN system is expected to be deployed in suburban areas of the U.S. or Canada, or in developing countries, aiming to provide wireless communication services using the CR technology in an unused TV frequency band.

CR standardization and development is active but in an early stage. There still exists many issues to be handled and most of configurations for the CR technology are yet to be specified.

SUMMARY OF THE INVENTION

The present invention is directed to communication initialization in a CR wireless communication system.

Communication initialization is critical to CR in view of its nature. A CR communication system is required to continually monitor the spectrum of a licensed service provider. Upon sensing the presence of the licensed service provider on the spectrum, the CR communication system has to move to another available extra frequency band. While legacy communication systems operating under the strict regulations of the government have only to deal with problems with regards to given frequency bands, detection over the total available frequency band becomes critical to the CR communication system. Problems generated by different frequency detection results between CR wireless communication systems have to be tackled and above all things, the detection time in the frequency area is highly probable to increase. Because the increased frequency detection time is an obstacle to efficient communications, there exists a need for effectively solving the problem.

Accordingly, the present invention is directed to an effective communication initialization method in a MAC layer to solve the problems involved in the CR implementation.

An object of the present invention is to substantially solve at least the above problems and/or disadvantages and to provide at least the advantages below. Accordingly, the present invention provides a communication initialization method in a MAC layer for minimizing a frequency detection time in a CR communication system.

According to an aspect of the present invention, in a communication initialization method in a CR communication system having a service area overlapped with the service area of a licensed communication system which provides communication service in a licensed frequency band, a BS senses total available frequency bands for providing communication service and detects unused frequency bands for licensed communication systems or other CR communication systems. Then, the BS prepares for providing the communication service to CPEs in the unused frequency bands.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Before describing a communication initialization method in a CR communication system according to the present invention, the terms used herein will first be defined below.

CR System: a wireless communication system using the CR technology;

Licensed Primary System: a wireless communication system legally authorized to use a frequency;

Base Station (BS): a device located at the center of a cell, for enabling communications of Customer Premise Equipments (CPEs) within its coverage area; and CPE: a user or device that communicates through the BS.

In accordance with the present invention, requirements for the CR communication system are defined as follows.

1. A CR communication system is limited to a point-to-multipoint cellular communication system. In the cellular system, a BS located at the center of a cell communicates with CPEs within its coverage area.

2. Upon sensing the presence of a licensed primary user in the current frequency band, the CR wireless communication system has to immediately move to another unused frequency band, discontinuing the use of the current frequency band. This is mandatory to the CR communication system to avoid interference with licensed primary users.

3. The CR wireless communication system has to be equipped to dynamically sense the operation statuses of other wireless communication systems in order not to interfere with existing licensed primary systems. When sensing the presence of any other device at a certain frequency by the frequency sensing function, the CR wireless communication system determines if the device is a licensed primary system or another CR wireless communication system and operates correspondingly.

A communication initialization method according to the present invention is an initialization protocol for the MAC layer, independent of the properties of the physical layer. A detailed description of how a frequency band is sensed and how a communication system that has sent a sensed signal is identified in the physical layer will not be provided. The present invention is described on the assumption that requirements for the physical layer for practical implementation of CR can be satisfied.

Relative to other wireless communication systems, communication initialization is not so simple in the CR system. Due to the nature of CR system, i.e. detection of an unused frequency band, upon sensing the presence of a licensed primary user in the current frequency band, the frequency band has to be immediately changed. For notational simplicity, five different frequency bands identified by their channel indexes, channel 1 to channel 5 are assumed.

Figure 1:
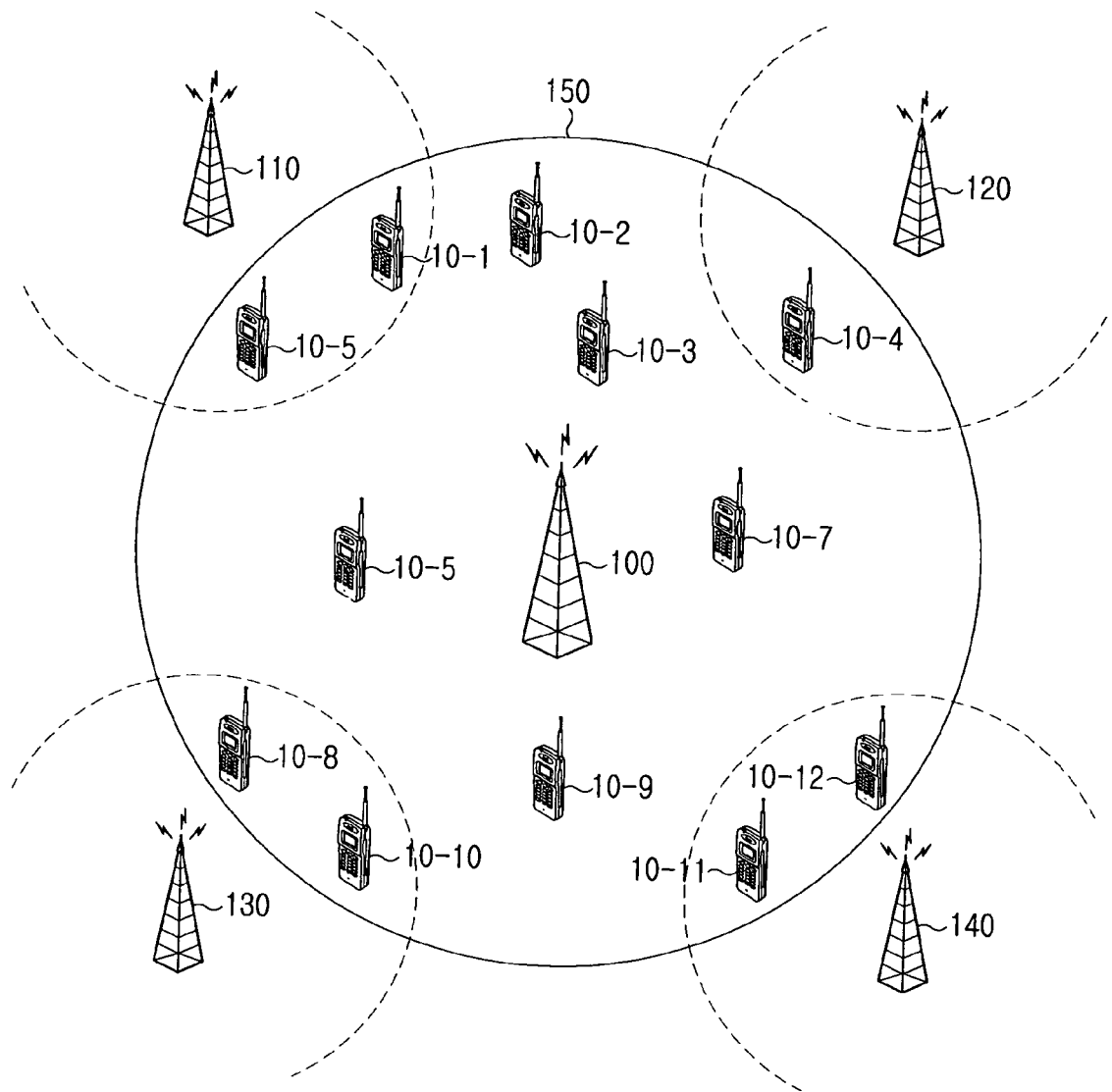
FIG. 1 illustrates a network configuration to be referred to for describing an operation of a CR system according to the present invention.

FIG. 1 illustrates a network configuration to be referred to for describing an operation of the CR system according to the present invention.

Referring to FIG. 1, the service area 150 of a BS 100 (CR BS) in the CR system is overlapped with those of BSs 110 and 120 in licensed primary systems and BSs 130 and 140 in neighbor CR systems. The licensed primary systems 110 and 120 use channel 1 and channel 2, respectively, and the neighbor CR systems 130 and 140 use channel 3 and channel 4, respectively. A plurality of CPEs 10-1 to 10-12 are scattered within the service area 150 of the BS 100. Some of them, i.e. the CPEs 10-1, 10-4, 10-5, 10-8, 10-10, 10-11 and 10-12 are located in overlap areas between the service areas of the BSs 110 to 140 and the service area 150 of the BS 100.

The CR BS 100 and the CPEs 10-1 to 10-12 can sense frequency bands as well as perform communications. The BS 100 does not have knowledge of the frequency use status of every CPE that it services. Especially when there are a plurality of CR system operators, the BS has more difficulty in determining the frequency use status of neighbor CPEs. If a currently serviced CPE is located in an overlap area between a licensed primary system and the CR BS 100 or between another CR system and the CR BS 100, these systems affect the CPE, and are affected by signal propagation of the BS 100. In the illustrated case of FIG. 1, although the CR BS 100 may determine through frequency sensing that all of channel 1 to channel 5 are available, in fact, channel 1 and channel 2 are in use for the licensed primary systems 110 and 120, and the CPEs 10-1, 10-4 and 10-5 serviced by the CR BS 100 are within the coverage area of the licensed primary systems 110 and 120. Also, channel 3 and channel 4 are in use for the other CR systems 130 and 140. In this case, the point is which channel the CR BS 100 has to select. The CR BS 100 sends frequency sensing request information over the frequency bands sensed as available to the CPEs 10-1 to 10-12 and selects a frequency band for use based on the result for each frequency band received from the CPEs 10-1 to 10-12. Considering the existence of CPEs that cannot interpret particular frequency band information or CPEs that cannot respond due to a power-off state while in the service areas of the licensed primary systems 110 and 120 and the other CR systems 130 and 140, a new MAC initialization technique is required for the CR BS 100 to select a frequency band.

Despite power-off states or during communications, the CR BS 100 has to sense as many frequency bands as possible to thereby determine available frequency bands. After determining the available frequency bands, the CR BS 100 sends a control signal at a preset position in all or part of the frequency bands unused for the licensed primary systems 110 and 120 and the other CR systems 130 and 140. In the present invention, the control signal is referred to as a Ready to Use (RTU)-1 signal. The RTU-1 signal is sent with a very narrow bandwidth, compared to the bandwidth of each frequency band and may have a pattern easily sensible to other CR systems. The RTU-1 signal contains the Identifier (ID) of a serving BS (BSID), a Training Frequency Set (TFS) that the BS sensed as available, and a known Training Sequence Signal (TSS) by which other BSs or CPEs capable of receiving the RTU-1 signal can find out the status of the channel (e.g. Signal-to-Interference Noise Ratio (SINR)). The BS periodically sends the RTU-1 signal over all available frequency bands.

Figure 2:
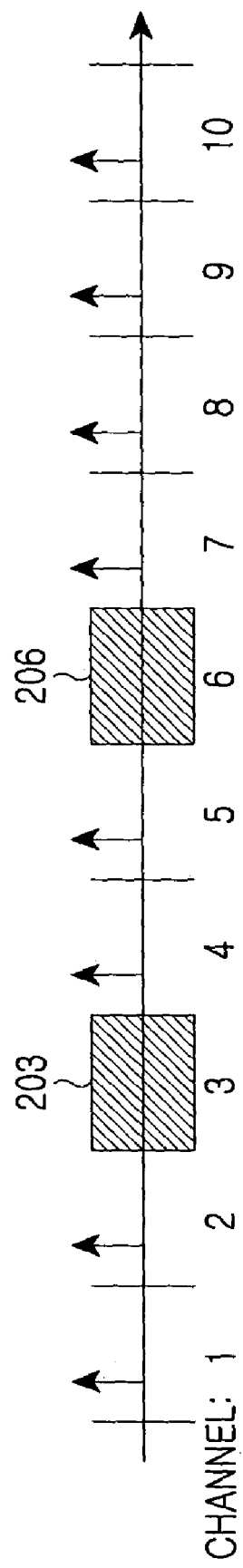
FIG. 2 illustrates transmission of an RTU-1 signal in a communication initialization method in the CR system according to the present invention.

FIG. 2 illustrates transmission of the RTU-1 signal in the communication initialization method in the CR system according to the present invention.

Referring to FIG. 2, the CR BS periodically sends the RTU-1 signal for a preset time over all or part of the frequency bands except for those occupied by licensed primary systems or other CR systems detected by the CR BS, that is, over channel 1, channel 2, channel 4, channel 5, channel 7, channel 8, channel 9 and channel 10 in FIG. 2. Unused frequency bands are denoted by 203 and 206. The RTU-1 signal includes a BSID, a TFS, and a TSS, and is defined as shown in Equation (1):

$$\text{RTU-1} = \{\text{BSID}, \text{TFS}, \text{TSS}\} \tag{1}$$

The CR BS 100 periodically sends the RTU-1 signal and receives channel reports from CPEs in response to the RTU-1 signal. The CR BS 100 excludes a frequency band in which a licensed primary system or another CR system may significantly affect a CPE from the next RTU-1 transmission based on the channel reports. The transmission periods of the RTU-1 signal and the channel report are determined by a CR system operator.

It may occur that RTU-1 signals in a commonly available frequency band from a plurality of other CR system operators collide with each other, thereby making it impossible for CPEs or neighbor BSs to reliably interpret the RTU-1 signals. As a consequence, the available frequency band is rendered unavailable. To solve this problem, each BS sends the RTU-1 signal in Carrier Sense Multiple Access/Collision Avoidance (CSMA/CA) with backoff. Upon sensing the presence of an RTU-1 signal in the available frequency band before signal transmission, the BS waits for a backoff time. If detecting a licensed primary system during the backoff, the BS immediately stops the RTU-1 transmission attempt.

The backoff operation goes with CSMA/CA. A BS or a CPE monitors if a medium (i.e. a frequency band) is clear before signal transmission. Upon detection of an energy level greater than or equal to a threshold in the medium, the BS or CPE waits, having determined that the medium is in use and activates a backoff timer. A backoff time later, the BS or CPE attempts signal transmission.

Figure 3:
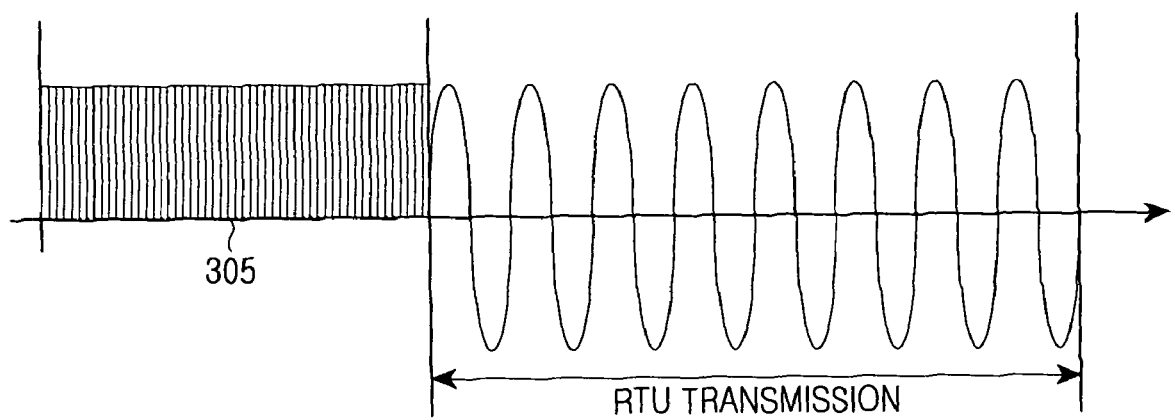
FIG. 3 illustrates a backoff operation for preventing collision between RTU-1 signals in the communication initialization method in the CR system according to the present invention.

FIG. 3 illustrates a backoff operation for preventing collision between RTU-1 signals in the communication initialization method in the CR system according to the present invention.

Referring to FIG. 3, the CR BS 100 senses an RTU-1 signal in an available frequency band before signal transmission and attempts the signal transmission after a backoff period 305.

The backoff time can be set and the backoff timer can be operated in many ways, which will not be described herein. CPEs, which have received the RTU-1 signal, acquire a Training Frequency Set (TFS) and channel status information of each frequency band (for example a signal to noise ratio SINR) from the RTU-1 signal. The CPEs then feed back channel reports to the CR BS 100 in a plurality of frequency bands in which the licensed primary system and other CR systems have no influence on the CPEs. The number of frequency bands for carrying the channel reports is determined by a service provider.

Figure 4:
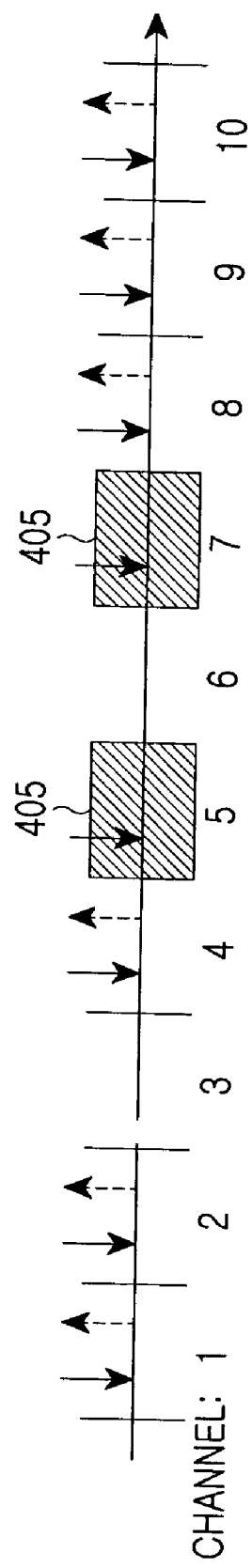
FIG. 4 illustrates transmission of channel reports from CPEs in the communication initialization method in the CR system according to the present invention.

FIG. 4 illustrates transmission of channel reports from CPEs in the communication initialization method in the CR system according to the present invention.

Referring to FIG. 4, upon receipt from the BS of an RTU-1 signal in unused frequency bands, a CPE replies with a channel report in CSMA/CA with backoff in a plurality of frequency bands in optimum channel status (e.g. optimum SINR status) and having no influence on a licensed primary system and other CR systems around the CPE, except for frequency bands 405 in use for the licensed primary system and other CR systems as sensed by the CPE.

In the illustrated case of FIG. 4, the CPE receives the RTU-1 signal over channel 1, channel 2, channel 4, channel 5, channel 7, channel 8, channel 9 and channel 10, but sends its channel report to the CR BS over channel 1, channel 2, channel 4, channel 8, channel 9 and channel 10 except two channels occupied by the licensed primary system and other CR systems, i.e. channel 5 and channel 7.

The channel report contains the ID of the CPE, a Current Band Channel Metric (CBCM), and a Not Available Training Frequency Set (NA-TFS), and is defined by Equation (2):

$$\text{Channel Report} = \{\text{CPE ID}, \text{CBCM}, \text{NA-TFS}\} \quad (2)$$

where CPE ID is an identification number specific to the CPE, which may contain location information of the CPE. CBCM contains the channel status information of each frequency band that has carried the RTU-1 signal from the BS, and NA-TFS denotes a frequency band set which is available to the BS but not available to the CPE at its location for some reason, e.g. for the reason that the frequency band set is occupied by neighbor systems. NA-TFS functions to notify the CR BS of frequency use status around the CPE, which is not known to the CR BS, i.e. frequency bands used for other CR systems and a frequency band locally used for a licensed primary system, to thereby avoid interference with the licensed primary system and the CR systems. NA-TFS includes information indicating the frequency bands that are not available are occupied by the licensed primary system or other CR systems.

In the case of simultaneous transmission of channel reports from CPEs, they may collide. To overcome this problem, the channel reports are delivered in CDMA/CA with a backoff.

As described above, RTU-1 transmission from the BS and channel report transmission from the CPEs are based on CSMA/CA with backoff. The CR system operator has to set a substantially sufficient time for transmission of the RTU-1 signal and the channel report signals. When a BS determines that it has received a sufficient number of channel reports, the BS will select an optimum frequency band. Considerations regarding channel report reception and the period of channel report transmission are determined by the service provider.

Upon receipt of channel reports from the CPEs, the BS selects the best frequency band according to whether each frequency band is in use or not, and according to channel status information from the CPEs (e.g. mean SINR). The BS selection process of the best frequency band is beyond the scope of the present invention and thus will not described herein. Then the BS notifies the CPEs of the selected frequency band.

The BS sends to the CPEs frequency band information associated with the selected frequency band in the frequency bands that delivered the RTU-1 signal, which is defined by Equation (3):

$$\text{Selected Frequency} = \{\text{BSID}, \text{SFS}\} \quad (3)$$

As noted from Equation (3), the selected frequency band information contains the BSID and a Selected Frequency Set (SFS).

During communications in the selected frequency band, the BS monitors frequency bands and periodically sends an RTU-2 signal in all frequency bands sensed as available except for the selected frequency band in current use. As with the case of FIG. 1, in the case where a CPE located within the service area of the neighbor CR system 130 has not sent a channel report due to a power-off state, for example, when the BS selects the same frequency band as that of the CR system 130, the transmission of the RTU-2 signal enables the CPE to send frequency band information about the selected frequency band in another frequency band. The transmission of the RTU-2 signal relieves the constraints of sensing excess frequency bands when there are other CPEs to communicate. The RTU-2 signal contains information about the current frequency band that carries the RTU-1 signal.

Figure 5:
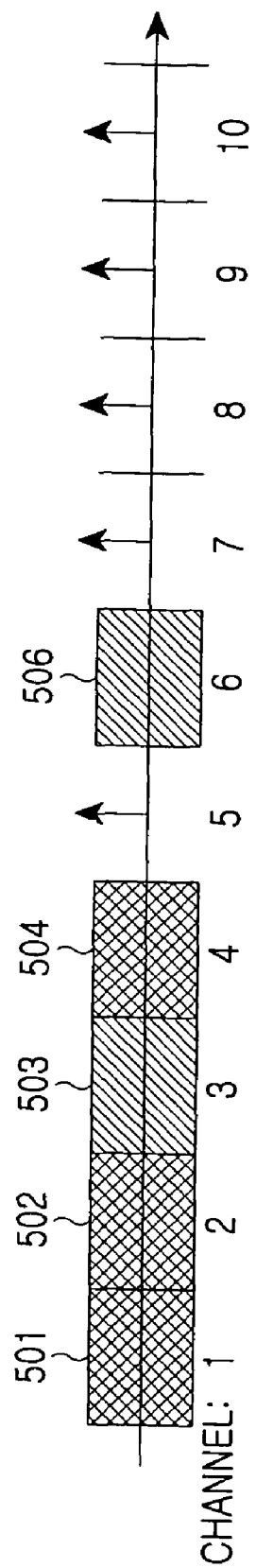
FIG. 5 illustrates transmission of the RTU-2 signal after the BS selects a frequency band in the communication initialization method in the CR system according to the present invention.

FIG. 5 illustrates transmission of the RTU-2 signal after the BS selects a frequency band in the communication initialization method in the CR system according to the present invention. To avoid collision with RTU-2 signals from other CR systems, the RTU-2 signal is periodically sent in CSMA/CA with a backoff. Upon detecting a licensed primary system authorized to use a predetermined frequency band in the frequency band, the BS discontinues transmission of the RTU-2 signal in the frequency band and updates information about the RTU-2 signal.

Referring to FIG. 5, the BS selects optimum frequency bands 501, 502 and 504 based on channel reports received from CPEs in response to the RTU-1 signal which was sent in frequency bands except for frequency bands 503 and 506 in use for the licensed primary system and other CR systems, and then sends the RTU-2 signal periodically in frequency bands except for these channels 501, 502, 503, 504 and 506, that is, over channels 5, 7, 8, 9, and 10. The RTU-2 signal contains a BSID, a Current Band List (CBL), a TFS, and a TSS, as defined by Equation (4):

$$RTU\text{-}2=\{BSID, CBL, TFS, TSS\} \qquad (4)$$

After the frequency band selection, the BS inserts a service identification signal identifying the CR system at a preset position of the frequency band so that other CR systems can sense frequency bands with a reduced sensing time.

Figure 6:
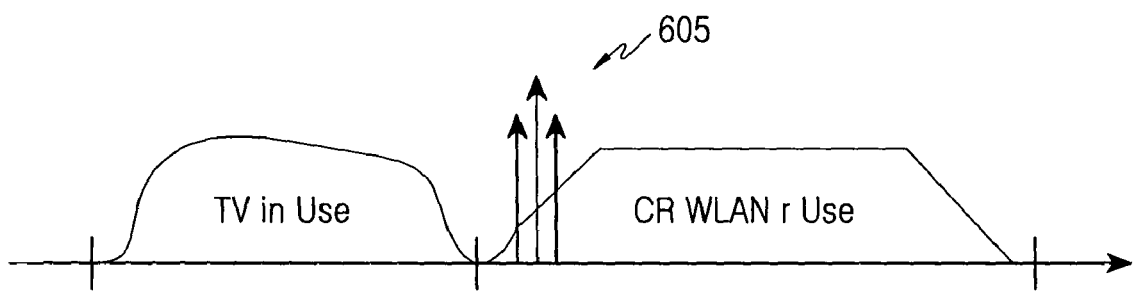
FIG. 6 is a diagram illustrating insertion of the service identification signal in the communication initialization method in the CR system according to the present invention.

FIG. 6 is a diagram illustrating insertion of the service identification signal in the communication initialization method in the CR system according to the present invention. Referring to FIG. 6, a CPE identifies a CR system by a service identification signal 605.

Figure 7:
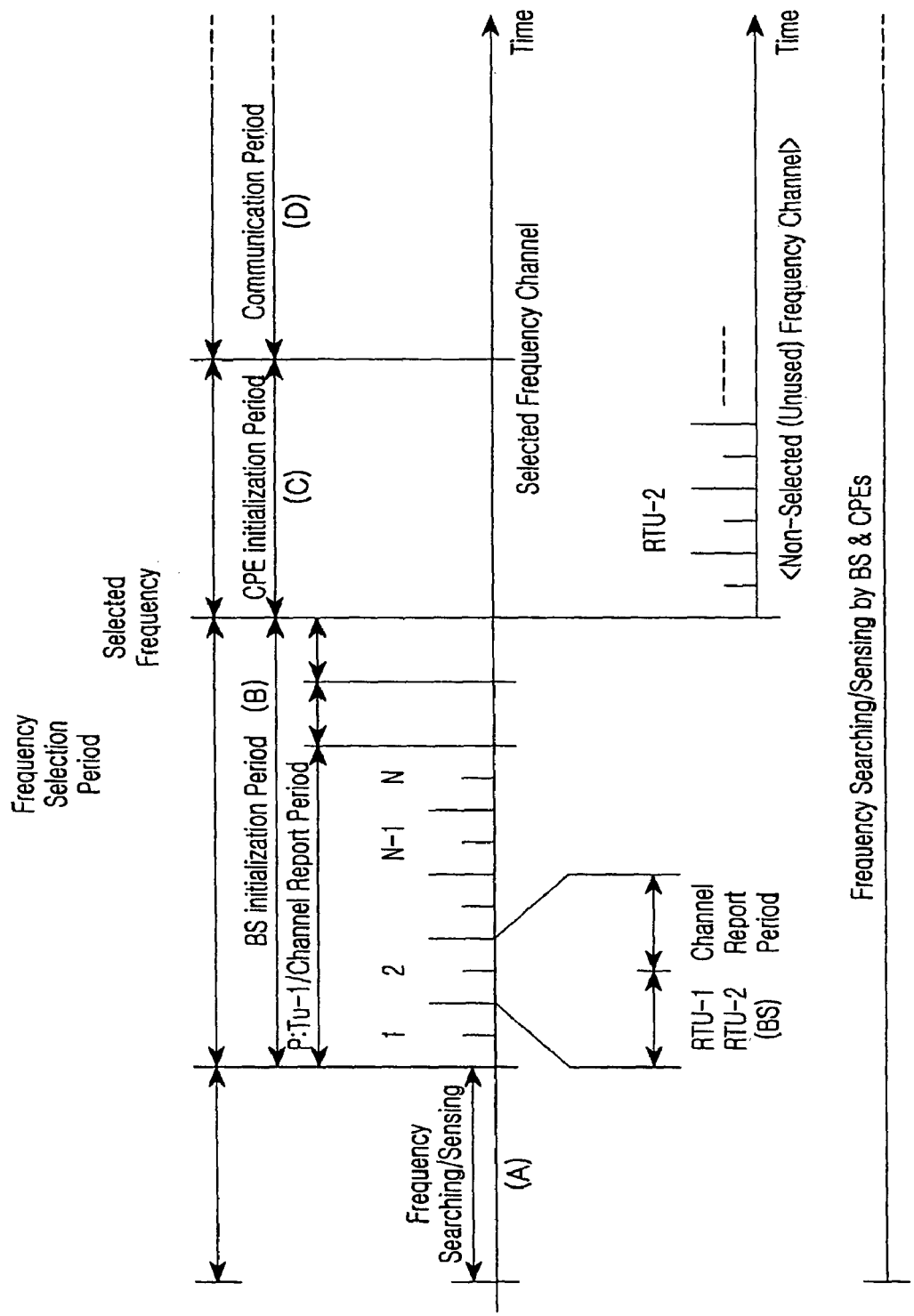
FIG. 7 illustrates the communication initialization method in the CR system according to the present invention.

FIG. 7 illustrates the communication initialization method in the CR system according to the present invention.

Referring to FIG. 7, the BS detects available frequency bands for a frequency searching/sensing period (A). For a BS initialization period (B), the BS selects an optimum frequency band by exchanging an RTU-1 signal and channel reports with CPEs and completes preparation for communications in the selected frequency band. The BS performs synchronization and process bandwidth requests for CPEs receiving control information from the BS for a CPE initialization period (C), and communications are conducted under the control of the BS for a communication period (D).

In accordance with the present invention as described above, the initialization method for the CR communication system enables efficient selection of a frequency band unused by licensed primary users and other CR systems and reduces a frequency sensing time before communications with CPEs, since a BS sends an RTU signal in available frequency bands to the CPEs, the CPEs reply with channel reports, and the BS sends an RTU-2 signal in extra available frequency bands during communications.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A communication initialization method for a base station (BS) in a Cognitive Radio (CR) communication system having a service area overlapped with a service area of at least one licensed communication system which provides a communication service in a licensed frequency band, the method comprising:
   sensing, by the BS, available frequency bands for providing a communication service from the BS;
   detecting unused frequency bands that are not used for the at least one licensed communication system or other CR communication systems; and
   preparing for providing the communication service to customer premise equipments (CPEs) in the unused frequency bands;
   wherein the preparing comprises:
      sending periodically a first ready-to-use (RTU) signal in the unused frequency bands;
      receiving channel report signals from the CPEs in response to the first RTU signal; and
      selecting a channel for providing the communication service according to the channel report signals,
   wherein the first RTU signal, having a predetermined pattern sensible to the other CR communication systems, is sent with narrower bandwidth than each frequency band, the first RTU signal including a Base Station Identification (BSID), a Training Frequency Set (TFS), and a Training Sequence Signal (TSS),
   wherein each of the channel report signals includes an ID of a CPE, a Current Band Channel Metric (CBCM) indicating the channel status of each of the frequency bands in which the first RTU signal was sent from the BS, and a Not Available Training Frequency Set (NA-TFS).

2. The communication initialization method of claim 1, wherein the preparing further comprises:
   sending a second RTU signal in frequency bands except for frequency bands used for the at least one licensed communication system or the other CR communication systems, and the selected channel;
   receiving channel report signals from the CPEs in response to the second RTU signal; and
   selecting a channel for providing the communication service according to the channel report signals received in response to the second RTU signal.

3. The communication initialization method of claim 2, wherein the second RTU signal includes a BSID, a Current Band List (CBL), a TFS, and a TSS.

4. The communication initialization method of claim 1, wherein the sending of the first RTU signal comprises sending the first RTU signal using a Carrier Sense Multiple Access/Collision Avoidance (CSMA/CA) with a backoff to prevent collision of signals.

5. The communication initialization method of claim 1, further comprising inserting a service identification signal identifying the CR system at a present position of a frequency band selected in view of the channel report signals from the CPEs.

6. A communication initialization method for a customer premise equipment in a Cognitive Radio (CR) communication system, the CR system having a service area overlapped with a service area of at least one licensed communication system which provides a communication service in a licensed frequency band, and the CR system having a base station sensing available frequency bands and detecting unused frequency bands that are not used for the at least one licensed communication system or other CR communication systems to provide a communication service to the customer premise equipment (CPE), the method comprising:
   receiving periodically a first ready-to-use (RTU) signal in the unused frequency bands from the base station;
   sending a channel report signal in response to the first RTU signal; and
   receiving the communication service in an unused frequency band from the base station based on a channel selection by the base station according to the channel report signal,
   wherein the first RTU signal, having a predetermined pattern sensible to the other CR communication systems, is sent with narrower bandwidth than each frequency band, the first RTU signal including a Base Station Identification (BSID), a Training Frequency Set (TFS), and a Training Sequence Signal (TSS), and
   the channel report signal includes an ID of the CPE, a Current Band Channel Metric (CBCM) indicating the channel status of each of the frequency bands in which the first RTU signal was sent from the base station, and a Not Available Training Frequency Set (NA-TFS).

7. The communication initialization method of claim 6, further comprising:
receiving a second RTU signal in frequency bands except for frequency bands used for the at least one licensed communication system or the other CR communication systems, and the selected channel;
sending a channel report signal in response to the second RTU signal; and
receiving the communication service from the base station based on a channel selection by the base station according to the channel report signal corresponding to the second RTU signal.

8. The communication initialization method of claim 6, wherein the sending of the channel report signal comprises sending the channel report signal using a Carrier Sense Multiple Access/Collision Avoidance (CSMA/CA) with a backoff to prevent collision of signals.

9. A communication initialization method for a customer premise equipment (CPE) in a Cognitive Radio (CR) communication system, the CR system having a service area overlapped with a service area of at least one licensed communication system which provides a communication service in a licensed frequency band, and the CR system having a base station sensing and determining unused frequency bands that are not used for the at least one licensed communication system or other CR communication systems to provide a communication service to the customer premise equipment, the method comprising:
receiving periodically a signal in the unused frequency bands from the base station;
sending a reply signal in response to the signal, in the unused frequency bands except for a frequency band of the unused frequency bands used by the at least one licensed communication system or the other CR communication systems; and
receiving the communication service in an unused frequency band from the base station based on a channel selection by the base station according to the reply signal,
wherein the signal, having a predetermined pattern sensible to the other CR communication systems, is sent with narrower bandwidth than each frequency band, the signal including an identifier of the base station, a frequency set detected by the base station as available, and a sequence signal by which other base stations or customer premise equipments capable of receiving the signal determines a status of a channel, and
wherein the reply signal comprises an identifier of the CPE, information corresponding to a channel status of each of the frequency bands in which the signal was sent from the base station, and information corresponding to a frequency use status around the CPE including frequency bands that are occupied by the at least one licensed communication system or the other CR communication systems.

10. The communication initialization method of claim 9, further comprising:
receiving another signal from the base station in frequency bands except for frequency bands used for the at least one licensed communication system or the other CR communication systems, and the selected channel;
sending a reply signal in response to the another signal; and
receiving the communication service from the base station based on a channel selected by the base station according to the reply signal corresponding to the another signal.

11. The communication initialization method of claim 10, wherein the sending of the reply signal corresponding to the another signal comprises sending the reply signal in the frequency bands from which the another signal is received except for a frequency band of the frequency bands from which the another signal is received that is used by the at least one licensed communication system or the other CR communication systems.

12. The communication initialization method of claim 9, wherein the sending of the reply signal comprises sending the reply signal using a backoff operation to avoid collision of signals.

* * * * *